(12) United States Patent
Britt

(10) Patent No.: US 6,634,976 B1
(45) Date of Patent: Oct. 21, 2003

(54) SPEED VARIATOR TRANSMISSION

(76) Inventor: Dennis E. Britt, 4264 Barker Ten Mile Rd., Lumberton, NC (US) 28358

( * ) Notice: Subject to any disclaimer, the term of this patent is extended or adjusted under 35 U.S.C. 154(b) by 0 days.

(21) Appl. No.: 09/866,993

(22) Filed: May 29, 2001

(51) Int. Cl.$^7$ ................................................. F16H 3/72
(52) U.S. Cl. ............................. 475/91; 475/89; 475/93; 475/198; 475/204
(58) Field of Search ............................. 475/91, 89, 93, 475/106, 198, 204, 290

(56) References Cited

U.S. PATENT DOCUMENTS

| | | | | |
|---|---|---|---|---|
| 2,198,398 A | * | 4/1940 | Szekely ........................ | 475/105 |
| 2,281,384 A | * | 4/1942 | Ross ............................. | 475/107 |
| 2,372,702 A | * | 4/1945 | Armentrout .................... | 475/93 |
| 2,441,606 A | * | 5/1948 | Trofimov ....................... | 475/89 |
| 2,464,494 A | * | 3/1949 | Ferreira ........................ | 188/271 |
| 2,602,461 A | * | 7/1952 | Walker .......................... | 475/89 |
| 2,640,375 A | * | 6/1953 | Trofimov ....................... | 475/136 |
| 2,653,487 A | * | 9/1953 | Martin et al. .................. | 180/172 |
| 3,119,282 A | * | 1/1964 | Raze ............................. | 475/31 |
| 3,925,987 A | * | 12/1975 | Faisandier ..................... | 425/451.5 |
| 4,493,227 A | * | 1/1985 | Schmid ......................... | 475/89 |
| 4,519,272 A | * | 5/1985 | Meier ........................... | 105/73 |
| 4,729,261 A | * | 3/1988 | Tervola ......................... | 475/107 |
| 4,788,889 A | * | 12/1988 | Davis et al. .................... | 74/331 |
| 5,085,101 A | * | 2/1992 | Oldfield ........................ | 188/270 |
| 5,102,376 A | * | 4/1992 | Batt .............................. | 475/72 |
| RE34,209 E | * | 3/1993 | McGarraugh .................. | 475/89 |
| 5,224,907 A | * | 7/1993 | Shirataki ....................... | 475/205 |
| 5,611,746 A | * | 3/1997 | Shaffer ......................... | 475/88 |
| 6,010,423 A | * | 1/2000 | Jolliff et al. ................... | 475/93 |

* cited by examiner

*Primary Examiner*—Sherry Estremsky
*Assistant Examiner*—Eric M. Williams
(74) *Attorney, Agent, or Firm*—Mills Law Firm PLLC

(57) ABSTRACT

A continuously variable ratio transmission includes a planetary gear set connected to a prime mover having first and second output shafts. The first output shaft is connected in a hydraulic braking circuit including a positive displacement pump and an operator controlled variable flow valve for varying the resistive torque on the output shaft and effective a gear ratio change at the other output shaft.

8 Claims, 2 Drawing Sheets

SPEED VARIATOR TRANSMISSION

FIELD OF THE INVENTION

The present invention relates to power transmission, and, in particular, a speed variator for providing continuously variable ratio on the transmission of power.

BACKGROUND OF THE INVENTION

Many approaches have been taken in the prior art to provide for transmission of power between a prime mover, such as an engine or motor, and a device driven thereby. In the vehicular field, transmissions are available providing a variety of gear ratios, manually or automatically. However, there has been continuing interest in power transmitting to provide stepless, continuously variable speed transmission wherein the relative speed between an input shaft and an output shaft can be continuously varied.

A favored approach has been to utilize a variator system in which the speed of an output shaft is dependent on the relative speeds of the input shaft and an auxiliary variator shaft. Utilizing primarily variable pitch pulleys, planetary gearing and differential gearing, varying components have been used to allow an operator to achieve an output ratio in accordance with operator preference or equipment performance demands.

In U.S. Pat. No. 5,167,591 to Cowan, an infinitely adjustable, variable speed transmission for bicycles is disclosed wherein a variator including manually adjustable variable pitch pulleys are used to vary the output speed of planetary gearing connected to the driven bicycle wheel. A related system is disclosed in U.S. Pat. No. 5,167,591 to Cowan. A further such system is disclosed in U.S. Pat. No. 4,553,450 to Gizard. The speed ratio range afforded the pulley system is limited.

Other approaches have used toroidal race drives such as disclosed in U.S. Pat. Nos. 5,667,458 to Fellows and 4,628,766 to Perry. Such transmissions are mechanically complex and costly. Electromechanical braking of one shaft of a twin differential gear set is disclosed in U.S. Pat. No. 2,441,606 to Trofimov to provide limited variation in gear ratio between a prime mover and an output drive train.

In view of the foregoing, it would be desirable to provide a compact variator for infinitely adjusting the output speed in a drive train in a manner that overcomes the foregoing limitations heretofore associated with variable pitch pulleys and friction drives, and like variators.

Accordingly, it is an object of the present invention to provide a variator providing affirmative, continuously adjustable differential output speeds.

Another object of the invention is to provide a variable ratio transmission using a hydraulic brake to continuously vary output speed between ratio limits.

A further object of the invention is to provide a speed variator for a drive transmission using a variable flow, positive displacement hydraulic circuit to vary the output speed of a planetary drive train.

SUMMARY OF THE INVENTION

The foregoing objects are accomplished by a variable speed transition wherein a secondary differential disposed between the prime mover input shaft and differential driven output shafts has one output shaft coupled with a variable flow control valve and positive displacement pump in a hydraulic circuit for providing variable braking thereto effecting a ratio change in the other output shaft thereby selectively changing the drive train ratio. The secondary differential may employ planetary gearing or conventional differential bevel gearing. At open condition, the controlled output shaft is minimally braked and a direct drive is provided to the output differential. As the valve is closed, the output pressure increase at the positive displacement pump and effects an increasing resistive torque at the shaft resulting in an increased speed at the output shaft. At full control valve closure, the differential is locked and a final drive ratio approaching the theoretic ratio of 2:1 is established, with continuous variable control therebetween. For incorporation in to vehicles, from passenger and recreational to commercial, appropriate clutching and reverse gearing may be incorporated.

DESCRIPTION OF THE DRAWINGS

The above and other objects and advantages of the present invention will become apparent upon reading the following detailed description taken in conjunction with the accompanying drawings in which.

DETAILED DESCRIPTION OF THE PREFERRED EMBODIMENTS

Figure 1:
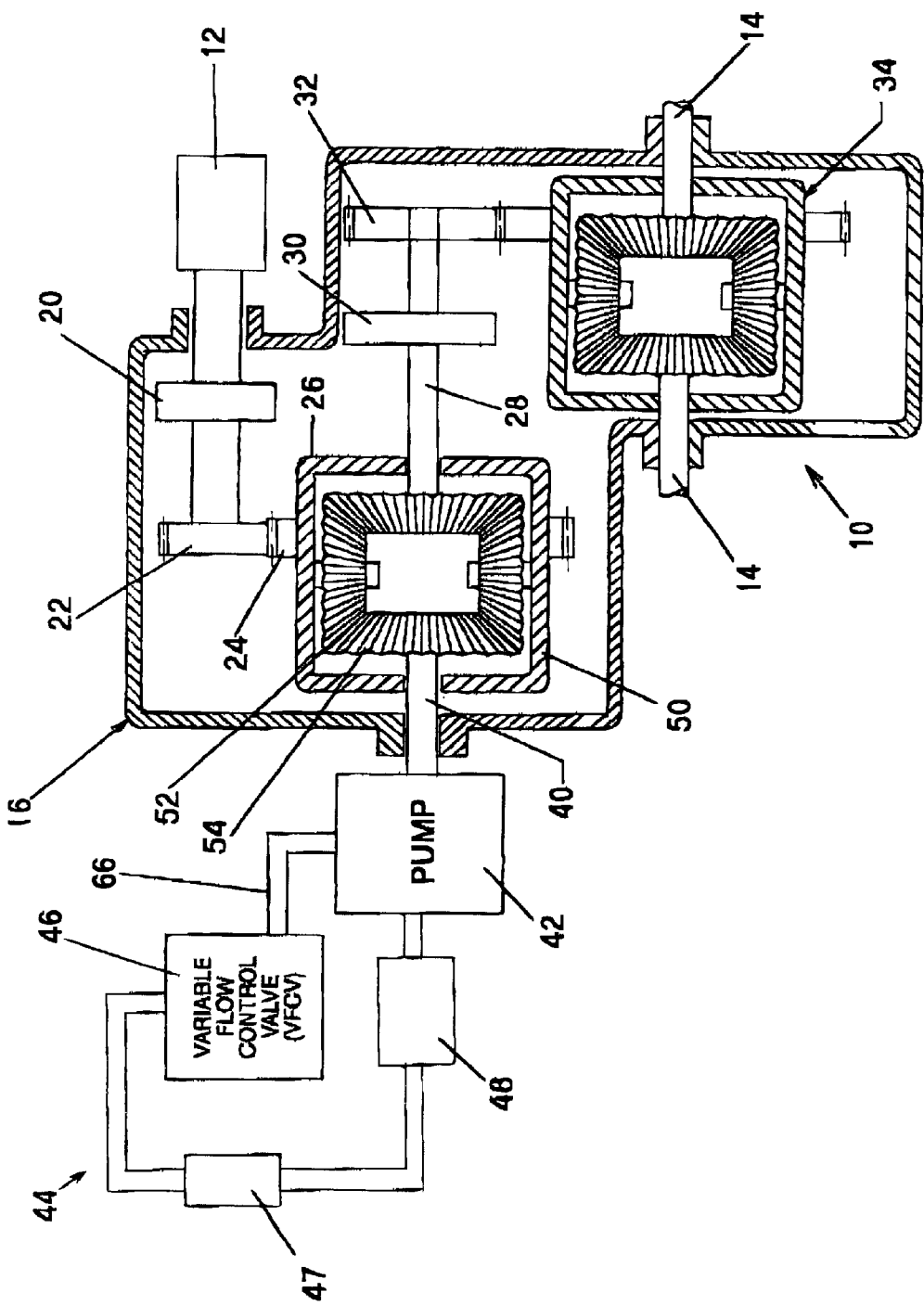
FIG. 1 is an illustrative schematic view of a drive train transmission provided with a variator in accordance with the invention coupled with a differential gear train.

Referring to the drawings for the purpose of describing the preferred embodiment and not for limiting same, FIG. 1 illustrates a drive train transmission 10 for delivering at infinitely varying output speed power from a prime mover 12 to shaft outputs 14, such as the drive wheels of a vehicle or like power consuming load, as accommodated by a variator 16 in accordance with the invention. The prime mover 12 is connected in a driveline with a clutch 20 and an input gear 22 connected with an outer ring gear 24 on the variator carrier. The variator 16 includes a first beveled sun gear connected to drive output shaft 28 in an output driveline including reversal unit 30 and to an input gear 32 to the ring gear of an output differential unit 34 including the output shafts 14. The variator 16 further includes a variator output shaft 40 connected with the other beveled side sun gear and operatively connected to the impeller of a fluid pump 42 in a closed hydraulic braking circuit 44 including a variable flow control valve 46, a fluid cooler 47 and a fluid reservoir 48.

The variator 16 includes the carrier 50 carrying a differential gear set 52. One side sun gear of the differential get set 52 is connected with the output shaft 40, and the other side sun gear is connected with the drive output shaft 28.

The clutch 20 serves to disengage the output shaft 22 of the prime mover 12 from the input shaft of the variator 16 in order to allow the prime mover to idle without operative connection to the transmission. Mechanical, electromechanical, electrochemical, hydraulic clutches and the like may be used for the disengagement function. A hydraulically actuated clutch is preferred.

The fluid pump may be any suitable positive displacement pump effective upon rotational input to receive fluid from the sump and to deliver fluid at an elevated pressure through outlet line 66. Fixed displacement unidirectional fluid pumps are preferred, such as a gear pump. Such pumps upon rotation of the input shaft are effective for delivering a fluid volume under pressure. When the outlet line is blocked in the presence of input torque, the input shaft is effectively locked. When non-restricted flow is established, the input shaft rotates freely, substantially without resistance above threshold amounts. For flow variations therebetween, progressively closing the control valve 46 increases the braking torque at the variator shaft 40 thereby decreasing the rotational speed thereof and increasing the speed of the output shaft 28 for a given prime mover speed. Accordingly, it will be appreciated that progressive closing of the control valve 46 will effectively increase the output gear ratio of the variator from 1:1 up to the theoretical ratio of 2:1 at lockup of the variator shaft 40 and pump 42.

The reversing gear set 30 may be any conventional mechanical device effective upon operator command to change the relative rotation of the output shaft 28 and the input to the differential unit 34 thereby reversing the rotation of the output shafts 14. A planetary unit or a manual gearbox with forward and reverse gears will effect such results in a well known manner.

In operation, by way of illustrative example, with the clutch 20 disengaged and the reversing gear set 30 in forward drive condition, the prime mover 12 freely idles. Upon engagement of the clutch 20, the input shaft is drivingly engaged with the variator differential 26. At rest, the flow control valve 46 is fully open and the shaft 40 to the pump 42 rotates against minimal braking torque, and a driving torque is not transmitted. As the flow control valve 46 is progressively closed, the braking torque is effective for progressively increasing the speed of the output shaft 28 from the variator and resultantly the output speed of the shafts 14. In the fully closed position, maximum braking and accordingly the highest variator gear ratio is provided. Thus in combination with engine speed, the desired gear ratio can be established in accordance with performance and economy preferences.

Figure 2:
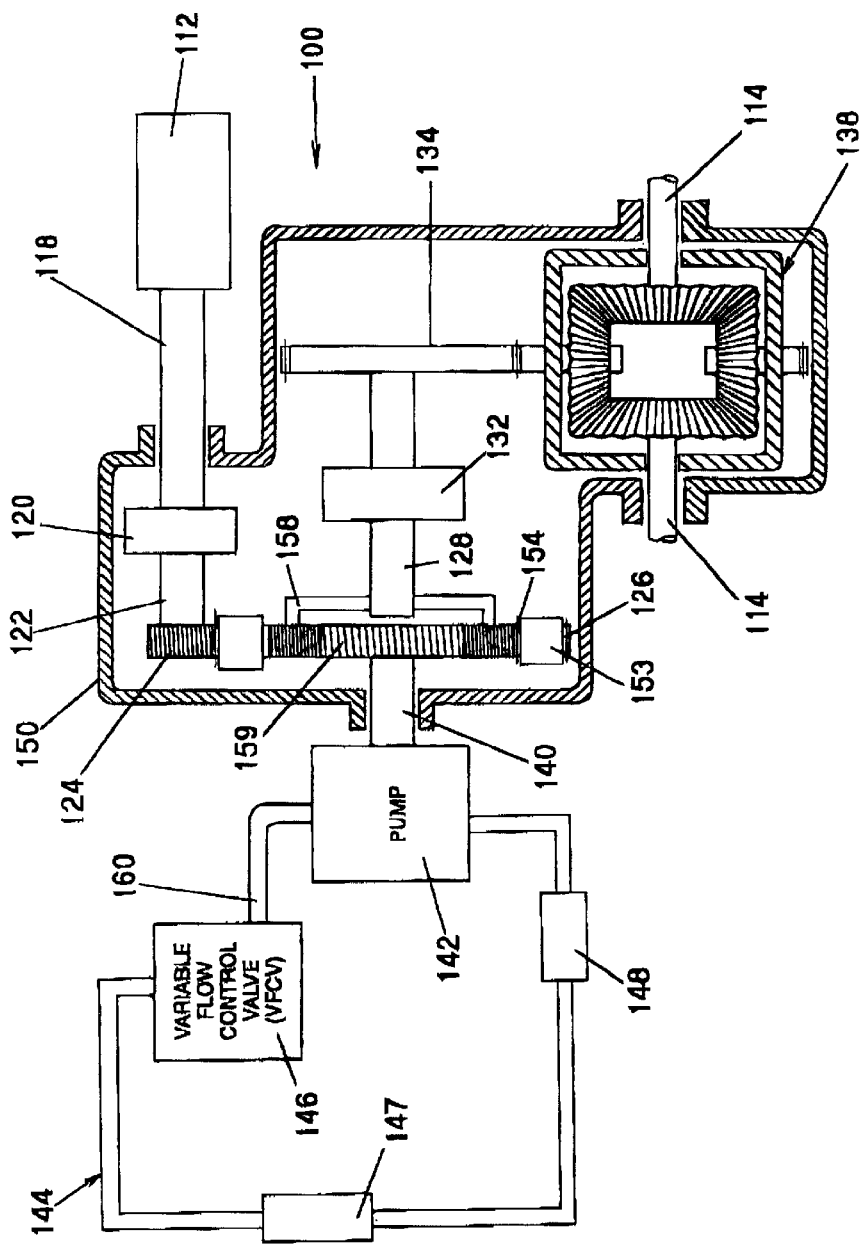
FIG. 2 is an illustrative schematic view of a drive train transmission and variator coupled with a planetary gear train.

Referring to FIG. 2, there is shown a variator transmission 100 using a planetary gear unit for effecting drive ratios at the variator. Therein, the transmission 100 delivers infinitely varying output speed power from a prime mover 112 to output shafts 114, such as the drive wheels of a vehicle or like power consuming load, as accommodated by a variator 116 in accordance with the invention. The prime mover 112 includes an input shaft 118 connected in a driveline with a clutch 120 and the input shaft 122 and input pinion 124 to the outer ring gear 126 of the variator 16. The variator 116 further includes an output shaft 128 connected in an output driveline to a reversal unit 132 and to an input pinion 134 drivingly engaging the ring gear 136 of a differential unit 138 driving the output shafts 114.

The variator 116 further includes a variator shaft 140 operatively connected to a fluid pump 142 having a closed fluid loop 144 including a variable flow control valve 146, a fluid cooler 147 and a fluid reservoir 148.

The variator 16 includes a housing 150 carrying a planetary gear differential gear set 152. The differential get set 152 includes outer ring gear 136 on outer ring 153, inner ring gear 154 on the ring 153 meshing with planet gears 154 connected to carrier 156 coupled with shaft 128. The planet gears mesh with sun gear 158 coupled with variator shaft 140.

The clutch 120 serves to disengage the shaft 122 from the prime mover 112 and the input shaft of the variator 116 in order to allow the prime mover to idle without operative connection to the transmission. Mechanical, electromechanical, electrochemical, hydraulic clutches and the like may be used for the disengagement function. A hydraulically actuated clutch is preferred.

The fluid pump 142 may be any suitable positive displacement pump effective upon rotational input to receive fluid from the reservoir 148 and to deliver fluid at an elevated pressure through outlet line 160. Fixed displacement unidirectional fluid pumps are preferred, such as a gear pump. Such pumps upon rotation of the input shaft are effective for delivering a fluid volume under pressure. When the outlet line is blocked in the presence of input torque, the input shaft is effectively locked. When non-restricted flow is established, the input shaft rotates freely, substantially without resistance above threshold amounts. For flow variations therebetween, progressively closing the control valve increases the braking torque at the input shaft thereby decreasing the rotational speed thereof and increasing the speed of the output shaft for a given prime mover speed. Accordingly, it will be appreciated that progressive closing of the control valve 146 will effectively increase the output gear ratio of the variator up to the theoretical ratio of 2:1 at lockup of the input shaft to the pump.

The reversing gear set 132 may be any conventional mechanical device effective upon operator command to change the relative rotation of the output shaft 128 and the input to the differential unit thereby reversing the rotation of the rear axle shafts to the wheels. A planetary unit or a manual gearbox with forward and reverse gears will effect such results in a well known manner.

In operation, by way of illustrative example, with the clutch 120 disengaged and the reversing gear 132 in forward drive condition, the prime mover 112 freely idles. Upon engagement of the clutch 120, the input shaft is drivingly engaged with the variator differential 116. At rest, the flow control valve 146 is fully open and the variator shaft 140 to the pump 142 rotates against minimal braking torque and a driving torque is not transmitted. As the flow control valve 146 is progressively closed, the braking torque is effective for progressively increasing the speed of the output shaft 128 of the variator and output speed of the drive shafts 114. In the fully closed position, maximum braking and accordingly the highest variator gear ratio is provided. Thus in combination with engine speed, the desired gear ratio can be established in accordance with performance and economy preferences.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claims.

What is claimed:

1. In combination: a prime mover having a transverse driveline including an output gear, a pair of transverse output drive shafts coupled to a power consuming load and parallel to said driveline from said prime mover; a planetary gear unit, said planetary gear unit including a carrier having a first set of opposed beveled gears rotatably carried on said carrier and meshing with a second set of opposed beveled gears, said second set being connected with transversely oppositely outwardly extending first and second output shafts; a ring gear on said carrier meshing with said output gear of said drive line of said prime mover; a positive displacement pump connected to said first output shaft of said planetary gear unit; said pump having an input port and an output port; a hydraulic line fluidly connecting said input port and said output port and including an operator controlled variable flow control valve operable between a variable open position and a closed position, said control valve in said open position operable to vary the fluid flow through said hydraulic line and hydraulic pressure at said outlet port thereby varying the torque at said first output and effecting a gear ratio variation at said second output shaft of said planetary gear units; and output drive means operatively connecting said second output shaft to said transverse output drive shafts.

2. The transmission as recited in claim 1 wherein said output drive means is a differential gear unit including a pair of output shafts and an input from said second output shaft.

3. The transmission as recited in claim 1 wherein said positive displacement pump is a gear pump.

4. The transmission as recited in claim 1 wherein said hydraulic line includes a fluid reservoir between said flow control valve and said inlet port.

5. The transmission as recited in claim 4 wherein said hydraulic line includes a fluid cooler between said flow control valve and said inlet port.

6. The transmission as recited in claim 5 including clutch means between said driveline and said planetary gear unit.

7. The transmission as recited in claim 6 wherein said drive means includes gear means for selective changing the rotation said output shafts.

8. The transmission as recited in claim 4 wherein said drive means includes differential gear means connected between said second output and said output shaft.

* * * * *